(12) United States Patent
Barnes et al.

(10) Patent No.: US 8,513,168 B2
(45) Date of Patent: *Aug. 20, 2013

(54) METHOD AND COMPOSITION FOR ENHANCED HYDROCARBONS RECOVERY

(75) Inventors: Julian Richard Barnes, Amsterdam (NL); Kirk Herbert Raney, Houston, TX (US); Thomas Carl Semple, Friendswood, TX (US); Paul Gregory Shpakoff, Houston, TX (US); Johan Paul Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 497 days.

This patent is subject to a terminal disclaimer.

(21) Appl. No.: 12/366,554

(22) Filed: Feb. 5, 2009

(65) Prior Publication Data

US 2009/0203558 A1  Aug. 13, 2009

Related U.S. Application Data

(60) Provisional application No. 61/026,933, filed on Feb. 7, 2008, provisional application No. 61/026,944, filed on Feb. 7, 2008, provisional application No. 61/046,695, filed on Apr. 21, 2008, provisional application No. 61/073,600, filed on Jun. 18, 2008.

(51) Int. Cl.
*C09K 8/84* (2006.01)

(52) U.S. Cl.
USPC ........... 507/259; 507/265; 507/267; 507/277; 166/305.1

(58) Field of Classification Search
None
See application file for complete search history.

(56) References Cited

U.S. PATENT DOCUMENTS

| | | | | |
|---|---|---|---|---|
| 3,808,157 A | * | 4/1974 | De Witt et al. | 510/498 |
| 3,943,160 A | | 3/1976 | Farmer, III et al. | 260/458 |
| 3,946,812 A | | 3/1976 | Gale et al. | 166/274 |
| 4,008,768 A | | 2/1977 | Birk | 166/274 |

(Continued)

FOREIGN PATENT DOCUMENTS

| | | | |
|---|---|---|---|
| CA | 1249429 | 1/1989 | 31/31 |
| EP | 0003183 | 7/1979 | |

(Continued)

OTHER PUBLICATIONS

The Reservoir Engineering Aspects of Waterflooding, by Craig, Jr. 1971 Monograph vol. 3, Society of Petroleum Engineers.

(Continued)

*Primary Examiner* — John J Figueroa (57) ABSTRACT

A method of treating a hydrocarbon containing formation is described. The method includes (a) providing a hydrocarbon recovery composition to at least a portion of the hydrocarbon containing formation, wherein (i) when the salinity of the brine is from about 2 wt % to about 4 wt %, the composition comprises a blend of a $C_{20-24}$ internal olefin sulfonate and a $C_{24-28}$ internal olefin sulfonate wherein the weight ratio of the $C_{20-24}$ internal olefin sulfonate to the $C_{24-28}$ internal olefin sulfonate is from about 90:10 to about 70:30 and (ii) when the salinity of the brine is greater than about 4 wt % up to about 13 wt % the composition comprises a blend of a $C_{20-24}$ internal olefin sulfonate and a $C_{15-18}$ internal olefin sulfonate wherein the weight ratio of the $C_{20-24}$ internal olefin sulfonate to the $C_{15-18}$ internal olefin sulfonate is from about 90:10 to about 70:30; and (b) allowing the composition to interact with hydrocarbons in the hydrocarbon containing formation.

8 Claims, 8 Drawing Sheets

(56) References Cited

U.S. PATENT DOCUMENTS

| | | | |
|---|---|---|---|
| 4,029,608 A * | 6/1977 | Murata et al. | 510/497 |
| 4,077,471 A | 3/1978 | Shupe et al. | 166/275 |
| 4,098,818 A | 7/1978 | Krummel et al. | 260/535 R |
| 4,216,079 A | 8/1980 | Newcombe | 208/188 |
| 4,293,428 A | 10/1981 | Gale et al. | 252/8.55 D |
| 4,488,976 A | 12/1984 | Dilgren et al. | 252/8.55 D |
| 4,537,253 A | 8/1985 | Morita et al. | 166/274 |
| 4,597,879 A * | 7/1986 | Morita et al. | 507/259 |
| 4,690,217 A | 9/1987 | Taggart et al. | 166/274 |
| 4,736,795 A | 4/1988 | Karas | 166/274 |
| 4,979,564 A | 12/1990 | Kalpakci et al. | 166/273 |
| 5,057,627 A | 10/1991 | Edwards | 568/618 |
| 5,059,719 A | 10/1991 | Edwards | 568/618 |
| 5,068,043 A | 11/1991 | Thigpen et al. | 252/855.4 |
| 5,078,916 A * | 1/1992 | Kok et al. | 510/488 |
| 5,103,909 A | 4/1992 | Morgenthaler et al. | 166/288 |
| 5,199,490 A | 4/1993 | Surles et al. | 166/270 |
| 5,284,206 A | 2/1994 | Surles et al. | 166/270 |
| 5,311,943 A | 5/1994 | Wellington | 166/274 |
| 5,318,709 A | 6/1994 | Wuest et al. | 252/8.554 |
| 5,510,306 A | 4/1996 | Murray | 502/64 |
| 5,648,584 A | 7/1997 | Murray | 585/666 |
| 5,648,585 A | 7/1997 | Murray et al. | 585/671 |
| 5,654,261 A | 8/1997 | Smith | 507/269 |
| 5,723,423 A | 3/1998 | Van Slyke | 510/188 |
| 5,849,960 A | 12/1998 | Singleton et al. | 568/909 |
| 6,022,834 A | 2/2000 | Hsu et al. | 507/259 |
| 6,150,222 A | 11/2000 | Gardner et al. | 438/300 |
| 6,222,077 B1 | 4/2001 | Singleton | 568/909 |
| 6,269,881 B1 | 8/2001 | Chou et al. | 166/270.1 |
| 6,427,268 B1 | 8/2002 | Davis | 5/490 |
| 6,439,308 B1 | 8/2002 | Wang | 166/270 |
| 6,953,766 B2 | 10/2005 | Edwards | 502/208 |
| 6,977,236 B2 | 12/2005 | Eleveld et al. | 502/175 |
| 7,055,602 B2 | 6/2006 | Shpakoff et al. | 166/268 |

FOREIGN PATENT DOCUMENTS

| | | |
|---|---|---|
| EP | 0064384 | 11/1982 |
| GB | 2123882 | 3/1919 |
| GB | 2137676 | 3/1984 |
| GB | 2138866 | 3/1984 |
| GB | 2139270 | 3/1984 |
| GB | 2135713 A * | 9/1984 |

OTHER PUBLICATIONS

George J. Hirasaki et al., "Surfactant Based Enhanced Oil Recovery and Foam Mobility Control," DE-FC26-03NT15406, Jul. 2006.

Chatzis, et al., Correlation of Capillary Number Relationships for Sandstone, 1984 SPE Journal, vol. 29, pp. 555-562.

Wellington, et al., Low Surfactant Concentration Enhanced Waterflooding, Society of Petroleum Engineers Annual Technical Conf and Exhibition, Dallas, USA Oct. 22-25, 1995, pp. 389-405.

* cited by examiner

METHOD AND COMPOSITION FOR ENHANCED HYDROCARBONS RECOVERY

CROSS REFERENCE TO RELATED APPLICATIONS

This application claims priority to U.S. provisional application Ser. Nos. 61/026,933 and 61/026,944, both of which were filed on 7 Feb. 2008, 61/046,695 filed 21 Apr. 2008, and 61/073,600 filed 18 Jun. 2008, the entire disclosures of which are hereby incorporated by reference.

FIELD OF THE INVENTION

The present invention generally relates to methods for recovery of hydrocarbons from hydrocarbon formations. More particularly, embodiments described herein relate to methods of enhanced hydrocarbons recovery and to compositions useful therein which are specifically designed for use in hydrocarbon formations wherein the reservoir conditions, i.e., salinity and hardness, are relatively severe.

BACKGROUND OF THE INVENTION

Hydrocarbons may be recovered from hydrocarbon containing formations by penetrating the formation with one or more wells. Hydrocarbons may flow to the surface through the wells. Conditions (e.g., permeability, hydrocarbon concentration, porosity, temperature, pressure) of the hydrocarbon containing formation may affect the economic viability of hydrocarbon production from the hydrocarbon containing formation. A hydrocarbon containing formation may have natural energy (e.g., gas, water) to aid in mobilizing hydrocarbons to the surface of the hydrocarbon containing formation. Natural energy may be in the form of water. Water may exert pressure to mobilize hydrocarbons to one or more production wells. Gas may be present in the hydrocarbon containing formation (reservoir) at sufficient pressures to mobilize hydrocarbons to one or more production wells. The natural energy source may become depleted over time. Supplemental recovery processes may be used to continue recovery of hydrocarbons from the hydrocarbon containing formation. Examples of supplemental processes include waterflooding, polymer flooding, alkali flooding, thermal processes, solution flooding or combinations thereof.

In chemical Enhanced Oil Recovery (EOR) the mobilization of residual oil saturation is achieved through surfactants which generate a sufficiently (ultra) low crude oil/water interfacial tension (IFT) to give a capillary number large enough to overcome capillary forces and allow the oil to flow (I. Chatzis and N. R. Morrows, "Correlation of capillary number relationship for sandstone". SPE Journal, Vol 29, pp 555-562, 1989). However, reservoirs have different characteristics (crude oil type, temperature and the water composition—salinity, hardness) and it is desirable that the structures of added surfactant(s) be matched to these conditions to achieve a low IFT. In addition, a promising surfactant must fulfill other important criteria including low rock retention, compatibility with polymer, thermal and hydrolytic stability and acceptable cost.

Compositions and methods for enhanced hydrocarbons recovery utilizing an alpha olefin sulfate-containing surfactant component are known. U.S. Pat. Nos. 4,488,976 and 4,537,253 describe enhanced oil or recovery compositions containing such a component. Compositions and methods for enhanced hydrocarbons recovery utilizing internal olefin sulfonates are also known. Such a surfactant composition is described in U.S. Pat. No. 4,597,879. The compositions described in the foregoing patents have the disadvantages that brine solubility and divalent ion tolerance are insufficient at certain reservoir conditions. Furthermore, it would be advantageous if the IFT which can be achieved in relatively severe salinity and hardness conditions could be improved.

U.S. Pat. No. 4,979,564 describes the use of internal olefin sulfonates in a method for enhanced oil recovery using low tension viscous water flood. An example of a commercially available material described as being useful was ENORDET IOS 1720, a product of Shell Oil Company identified as a sulfonated $C_{17-20}$ internal olefin sodium salt. This material has a low degree of branching. U.S. Pat. No. 5,068,043 describes a petroleum acid soap-containing surfactant system for waterflooding wherein a cosurfactant comprising a $C_{17-20}$ or a $C_{20-24}$ internal olefin sulfonate was used. In "Field Test of Cosurfactant-enhanced Alkaline Flooding" by Falls et al., *Society of Petroleum Engineers Reservoir Engineering*, 1994, the authors describe the use of a $C_{17-20}$ or a $C_{20-24}$ internal olefin sulfonate in a waterflooding composition with an alcohol alkoxylate surfactant to keep the composition as a single phase at ambient temperature without affecting performance at reservoir temperature significantly. The water had a salinity of about 0.4 wt % sodium chloride. These materials, used individually, also have disadvantages under relatively severe conditions of salinity and hardness.

SUMMARY OF THE INVENTION

In an embodiment, hydrocarbons may be produced from a hydrocarbon containing formation having relatively high salinity and hardness, such as is the case in the North Sea, by a method that includes treating at least a portion of the hydrocarbon containing formation with a hydrocarbon recovery composition which is comprised of a blend of high molecular weight internal olefin sulfonates. The brine from the hydrocarbon containing formation which is reinjected into formation may be high in salinity and hardness. As used herein "salinity" refers to an amount of dissolved sodium, potassium, calcium and magnesium chloride solids in water. "Water hardness," as used herein, refers to a concentration of divalent ions (e.g., calcium, magnesium) in the water. As used herein, high salinity means that the brine has 2 wt % or more of sodium chloride and high hardness means that the concentration of calcium plus magnesium in the brine is greater than 0.01 wt %.

The present invention provides a method of treating these hydrocarbon containing formations which comprises (a) providing a hydrocarbon recovery composition to at least a portion of the hydrocarbon containing formation, wherein (i) when the salinity of the brine is from about 2 wt % to about 4 wt %, the composition comprises a blend of a $C_{20-24}$ internal olefin sulfonate and a $C_{24-28}$ internal olefin sulfonate wherein the weight ratio of the $C_{20-24}$ internal olefin sulfonate to the $C_{24-28}$ internal olefin sulfonate is from about 90:10 to about 70:30 and (ii) when the salinity of the brine is greater than about 4 wt % up to about 13 wt % the composition comprises a blend of a $C_{20-24}$ internal olefin sulfonate and a $C_{15-18}$ internal olefin sulfonate wherein the weight ratio of the $C_{20-24}$ internal olefin sulfonate to the $C_{15-18}$ internal olefin sulfonate is from about 90:10 to about 70:30; and (b) allowing the composition to interact with hydrocarbons in the hydrocarbon containing formation.

In an embodiment, the hydrocarbon recovery composition may comprise from about 1 to about 75 wt % of the blend of a $C_{20-24}$ internal olefin sulfonate and a $C_{24-28}$ internal olefin sulfonate or a $C_{15-18}$ internal olefin sulfonate, preferably from about 10 to about 40 wt % and more preferably from about 20 to about 30 wt %. In an embodiment, a hydrocarbon containing composition may be produced from a hydrocarbon containing formation. The hydrocarbon containing composition may include any combination of hydrocarbons, the blend described above, a solubilizing agent, methane, water, asphaltenes, carbon monoxide and ammonia.

In an embodiment, the hydrocarbon recovery composition is provided to the hydrocarbon containing formation by admixing it with water and/or brine from the formation. Preferably, the hydrocarbon recovery composition comprises from about 0.01 to about 0.75 wt % of the total water and/or brine/hydrocarbon recovery composition mixture (the injectable fluid). More important is the amount of actual active matter that is present in the injectable fluid (active matter is the surfactant, here the blend of a $C_{20-24}$ internal olefin sulfonate and a $C_{24-28}$ internal olefin sulfonate or a $C_{15-18}$ internal olefin sulfonate). Thus, the amount of the blend in the injectable fluid may be from about 0.01 to about 0.1 wt %, preferably from about 0.04 to about 0.05 wt %. The injectable fluid is then injected into the hydrocarbon containing formation.

A solubilizer may be added to the composition/brine mixture to keep it as a single phase before it is injected into the formation. The solubilizer may be an ethoxylated alcohol wherein the alcohol before ethoxylation had an average molecular weight of at least about 220. The solubilizer may have from about 5 to about 9 moles of ethylene oxide per mole of alcohol. In an embodiment, the solubilizer may have from about 5 to about 7 moles of ethylene oxide per mole of alcohol. The solubilizer may comprise 1 wt % or more of the total hydrocarbon recovery composition/brine mixture but a preferred solubilizer may comprise less than 0.1 wt % of the mixture, preferably about 0.02 to about 0.05 wt %.

In an embodiment, a hydrocarbon containing composition may be produced from a hydrocarbon containing formation. The hydrocarbon containing the composition may include any combination of hydrocarbons, internal olefin sulfonates, methane, water, asphaltenes, carbon monoxide and ammonia.

BRIEF DESCRIPTION OF THE DRAWINGS

Advantages of the present invention will become apparent to those skilled in the art with the benefit of the following detailed description of embodiment and upon reference to the accompanying drawings, in which.

While the invention is susceptible to various modifications and alternative forms, specific embodiments thereof are shown by way of example in the drawings and will herein be described in detail. It should be understood that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

"Average carbon number" as used herein is determined by multiplying the number of carbon atoms of each internal olefin sulfonate in the blend by the weight percent of that internal olefin sulfonate and then adding the products.

"$C_{15-18}$ internal olefin sulfonate" as used herein means a blend of internal olefin sulfonates wherein the blend has an average carbon number of from about 16 to about 17 and at least 50% by weight, preferably at least 75% by weight, most preferably at least 90% by weight, of the internal olefin sulfonates in the blend contain from 15 to 18 carbon atoms.

"$C_{20-24}$ internal olefin sulfonate" as used herein means a blend of internal olefin sulfonates wherein the blend has an average carbon number of from about 20.5 to about 23 and at least 50% by weight, preferably at least 65% by weight, most preferably at least 75% by weight, of the internal olefin sulfonates in the blend contain from 20 to 24 carbon atoms.

"$C_{24-28}$ internal olefin sulfonate" as used herein means a blend of internal olefin sulfonates wherein the blend has an average carbon number of from about 25 to about 27 and at least 50% by weight, preferably at least 60% by weight, most preferably at least 65% by weight, of the internal olefin sulfonates in the blend contain from 24 to 28 carbon atoms.

"Overall IOS blend" means a blend or mixture of two or more of the internal olefin sulfonates described above.

Hydrocarbons may be produced from hydrocarbon formations through wells penetrating a hydrocarbon containing formation. "Hydrocarbons" are generally defined as molecules formed primarily of carbon and hydrogen atoms such as oil and natural gas. Hydrocarbons may also include other elements, such as, but not limited to, halogens, metallic elements, nitrogen, oxygen and/or sulfur. Hydrocarbons derived from a hydrocarbon formation may include, but are not limited to, kerogen, bitumen, pyrobitumen, asphaltenes, oils or combinations thereof. Hydrocarbons may be located within or adjacent to mineral matrices within the earth. Matrices may include, but are not limited to, sedimentary rock, sands, silicilytes, carbonates, diatomites and other porous media.

A "formation" includes one or more hydrocarbon containing layers, one or more non-hydrocarbon layers, an overburden and/or an underburden. An "overburden" and/or an "underburden" includes one or more different types of impermeable materials. For example, overburden/underburden may include rock, shale, mudstone, or wet/tight carbonate (i.e., an impermeable carbonate without hydrocarbons). For example, an underburden may contain shale or mudstone. In some cases, the overburden/underburden may be somewhat permeable. For example, an underburden may be composed of a permeable mineral such as sandstone or limestone. In some embodiments, at least a portion of a hydrocarbon containing formation may exist at less than or more than 1000 feet below the earth's surface.

Properties of a hydrocarbon containing formation may affect how hydrocarbons flow through an underburden/overburden to one or more production wells. Properties include, but are not limited to, porosity, permeability, pore size distribution, surface area, salinity or temperature of formation. Overburden/underburden properties in combination with hydrocarbon properties, such as, capillary pressure (static) characteristics and relative permeability (flow) characteristics may effect mobilization of hydrocarbons through the hydrocarbon containing formation.

Permeability of a hydrocarbon containing formation may vary depending on the formation composition. A relatively permeable formation may include heavy hydrocarbons entrained in, for example, sand or carbonate. "Relatively permeable," as used herein, refers to formations or portions thereof, that have an average permeability of 10 millidarcy or more. "Relatively low permeability" as used herein, refers to formations or portions thereof that have an average permeability of less than about 10 millidarcy. One darcy is equal to about 0.99 square micrometers. An impermeable portion of a formation generally has a permeability of less than about 0.1 millidarcy. In some cases, a portion or all of a hydrocarbon portion of a relatively permeable formation may include predominantly heavy hydrocarbons and/or tar with no supporting mineral grain framework and only floating (or no) mineral matter (e.g., asphalt lakes).

Fluids (e.g., gas, water, hydrocarbons or combinations thereof) of different densities may exist in a hydrocarbon containing formation. A mixture of fluids in the hydrocarbon containing formation may form layers between an underburden and an overburden according to fluid density. Gas may form a top layer, hydrocarbons may form a middle layer and water may form a bottom layer in the hydrocarbon containing formation. The fluids may be present in the hydrocarbon containing formation in various amounts. Interactions between the fluids in the formation may create interfaces or boundaries between the fluids. Interfaces or boundaries between the fluids and the formation may be created through interactions between the fluids and the formation. Typically, gases do not form boundaries with other fluids in a hydrocarbon containing formation. In an embodiment, a first boundary may form between a water layer and underburden. A second boundary may form between a water layer and a hydrocarbon layer. A third boundary may form between hydrocarbons of different densities in a hydrocarbon containing formation. Multiple fluids with multiple boundaries may be present in a hydrocarbon containing formation, in some embodiments. It should be understood that many combinations of boundaries between fluids and between fluids and the overburden/underburden may be present in a hydrocarbon containing formation.

Production of fluids may perturb the interaction between fluids and between fluids and the overburden/underburden. As fluids are removed from the hydrocarbon containing formation, the different fluid layers may mix and form mixed fluid layers. The mixed fluids may have different interactions at the fluid boundaries. Depending on the interactions at the boundaries of the mixed fluids, production of hydrocarbons may become difficult. Quantification of the interactions (e.g., energy level) at the interface of the fluids and/or fluids and overburden/underburden may be useful to predict mobilization of hydrocarbons through the hydrocarbon containing formation.

Quantification of energy required for interactions (e.g., mixing) between fluids within a formation at an interface may be difficult to measure. Quantification of energy levels at an interface between fluids may be determined by generally known techniques (e.g., spinning drop tensiometer). Interaction energy requirements at an interface may be referred to as interfacial tension. "Interfacial tension" as used herein, refers to a surface free energy that exists between two or more fluids that exhibit a boundary. A high interfacial tension value (e.g., greater than about 10 dynes/cm) may indicate the inability of one fluid to mix with a second fluid to form a fluid emulsion. As used herein, an "emulsion" refers to a dispersion of one immiscible fluid into a second fluid by addition of a composition that reduces the interfacial tension between the fluids to achieve stability. The inability of the fluids to mix may be due to high surface interaction energy between the two fluids. Low interfacial tension values (e.g., less than about 1 dyne/cm) may indicate less surface interaction between the two immiscible fluids. Less surface interaction energy between two immiscible fluids may result in the mixing of the two fluids to form an emulsion. Fluids with low interfacial tension values may be mobilized to a well bore due to reduced capillary forces and subsequently produced from a hydrocarbon containing formation.

Fluids in a hydrocarbon containing formation may wet (e.g., adhere to an overburden/underburden or spread onto an overburden/underburden in a hydrocarbon containing formation). As used herein, "wettability" refers to the preference of a fluid to spread on or adhere to a solid surface in a formation in the presence of other fluids. Methods to determine wettability of a hydrocarbon formation are described by Craig, Jr. in "The Reservoir Engineering Aspects of Waterflooding", 1971 Monograph Volume 3, Society of Petroleum Engineers, which is herein incorporated by reference. In an embodiment, hydrocarbons may adhere to sandstone in the presence of gas or water. An overburden/underburden that is substantially coated by hydrocarbons may be referred to as "oil wet." An overburden/underburden may be oil wet due to the presence of polar and/or heavy hydrocarbons (e.g., asphaltenes) in the hydrocarbon containing formation. Formation composition (e.g., silica, carbonate or clay) may determine the amount of adsorption of hydrocarbons on the surface of an overburden/underburden. In some embodiments, a porous and/or permeable formation may allow hydrocarbons to more easily wet the overburden/underburden. A substantially oil wet overburden/underburden may inhibit hydrocarbon production from the hydrocarbon containing formation. In certain embodiments, an oil wet portion of a hydrocarbon containing formation may be located at less than or more than 1000 feet below the earth's surface.

A hydrocarbon formation may include water. Water may interact with the surface of the underburden. As used herein, "water wet" refers to the formation of a coat of water on the surface of the overburden/underburden. A water wet overburden/underburden may enhance hydrocarbon production from the formation by preventing hydrocarbons from wetting the overburden/underburden. In certain embodiments, a water wet portion of a hydrocarbon containing formation may include minor amounts of polar and/or heavy hydrocarbons.

Water in a hydrocarbon containing formation may contain minerals (e.g., minerals containing barium, calcium, or magnesium) and mineral salts (e.g., sodium chloride, potassium chloride, magnesium chloride). Water salinity and/or water hardness of water in a formation may affect recovery of hydrocarbons in a hydrocarbon containing formation. As used herein "salinity" refers to an amount of dissolved solids in water. "Water hardness," as used herein, refers to a concentration of divalent ions (e.g., calcium, magnesium) in the water. Water salinity and hardness may be determined by generally known methods (e.g., conductivity, titration). As water salinity increases in a hydrocarbon containing formation, interfacial tensions between hydrocarbons and water may be increased and the fluids may become more difficult to produce.

A hydrocarbon containing formation may be selected for treatment based on factors such as, but not limited to, thickness of hydrocarbon containing layers within the formation, assessed liquid production content, location of the formation, salinity content of the formation, temperature of the formation, and depth of hydrocarbon containing layers. Initially, natural formation pressure and temperature may be sufficient to cause hydrocarbons to flow into well bores and out to the surface. Temperatures in a hydrocarbon containing formation may range from about 0° C. to about 300° C. As hydrocarbons are produced from a hydrocarbon containing formation, pressures and/or temperatures within the formation may decline. Various forms of artificial lift (e.g., pumps, gas injection) and/or heating may be employed to continue to produce hydrocarbons from the hydrocarbon containing formation. Production of desired hydrocarbons from the hydrocarbon containing formation may become uneconomical as hydrocarbons are depleted from the formation.

Mobilization of residual hydrocarbons retained in a hydrocarbon containing formation may be difficult due to viscosity of the hydrocarbons and capillary effects of fluids in pores of the hydrocarbon containing formation. As used herein "capillary forces" refers to attractive forces between fluids and at least a portion of the hydrocarbon containing formation. In an embodiment, capillary forces may be overcome by increasing the pressures within a hydrocarbon containing formation. In other embodiments, capillary forces may be overcome by reducing the interfacial tension between fluids in a hydrocarbon containing formation. The ability to reduce the capillary forces in a hydrocarbon containing formation may depend on a number of factors, including, but not limited to, the temperature of the hydrocarbon containing formation, the salinity of water in the hydrocarbon containing formation, and the composition of the hydrocarbons in the hydrocarbon containing formation.

As production rates decrease, additional methods may be employed to make a hydrocarbon containing formation more economically viable. Methods may include adding sources of water (e.g., brine, steam), gases, polymers, monomers or any combinations thereof to the hydrocarbon formation to increase mobilization of hydrocarbons.

In an embodiment, a hydrocarbon containing formation may be treated with a flood of water. A waterflood may include injecting water into a portion of a hydrocarbon containing formation through injections wells. Flooding of at least a portion of the formation may water wet a portion of the hydrocarbon containing formation. The water wet portion of the hydrocarbon containing formation may be pressurized by known methods and a water/hydrocarbon mixture may be collected using one or more production wells. The water layer, however, may not mix with the hydrocarbon layer efficiently. Poor mixing efficiency may be due to a high interfacial tension between the water and hydrocarbons.

Production from a hydrocarbon containing formation may be enhanced by treating the hydrocarbon containing formation with a polymer and/or monomer that may mobilize hydrocarbons to one or more production wells. The polymer and/or monomer may reduce the mobility of the water phase in pores of the hydrocarbon containing formation. The reduction of water mobility may allow the hydrocarbons to be more easily mobilized through the hydrocarbon containing formation. Polymers include, but are not limited to, polyacrylamides, partially hydrolyzed polyacrylamide, polyacrylates, ethylenic copolymers, biopolymers, carboxymethylcellulose, polyvinyl alcohol, polystyrene sulfonates, polyvinylpyrrolidone, AMPS (2-acrylamide-2-methyl propane sulfonate) or combinations thereof. Examples of ethylenic copolymers include copolymers of acrylic acid and acrylamide, acrylic acid and lauryl acrylate, lauryl acrylate and acrylamide. Examples of biopolymers include xanthan gum and guar gum. In some embodiments, polymers may be crosslinked in situ in a hydrocarbon containing formation. In other embodiments, polymers may be generated in situ in a hydrocarbon containing formation. Polymers and polymer preparations for use in oil recovery are described in U.S. Pat. No. 6,427,268 to Zhang et al., entitled "Method For Making Hydrophobically Associative Polymers, Methods of Use and Compositions;" U.S. Pat. No. 6,439,308 to Wang, entitled "Foam Drive Method;" U.S. Pat. No. 5,654,261 to Smith, entitled, "Permeability Modifying Composition For Use In Oil Recovery;" U.S. Pat. No. 5,284,206 to Surles et al., entitled "Formation Treating;" U.S. Pat. No. 5,199,490 to Surles et al., entitled "Formation Treating" and U.S. Pat. No. 5,103,909 to Morgenthaler et al., entitled "Profile Control In Enhanced Oil Recovery," all of which are incorporated by reference herein.

The Hydrocarbon Recovery Composition

In an embodiment, a hydrocarbon recovery composition may be provided to the hydrocarbon containing formation. In this invention the composition comprises a blend of internal olefin sulfonates. Internal olefin sulfonates are chemically suitable for EOR because they have a low tendency to form ordered structures/liquid crystals (which can be a major issue because ordered structures tend to lead to plugging of the rock structure in hydrocarbon formations) because they are a complex mixture of surfactants of with different chain lengths. Internal olefin sulfonates show a low tendency to adsorb on reservoir rock surfaces arising from negative-negative charge repulsion between the surface and the surfactant. The use of alkali further reduces the tendency for surfactants to adsorb and reduced losses means a lower concentration of the surfactant can be used making the process more economic.

As discussed above in detail, this invention is particularly useful in hydrocarbon containing formations which have the characteristics of relatively high salinity and hardness, such as those in the North Sea. The brine from such hydrocarbon containing formations generally has greater than 2 wt % of sodium chloride and a hardness of calcium plus magnesium in the brine greater than 0.01 wt %.

The hydrocarbon recovery composition of this invention is designed to produce the best internal olefin sulfonate recovery composition for these hydrocarbon containing formations and for the brine found in these formations. When the salinity is from about 2 wt % to about 4 wt %, the composition comprises a blend of a $C_{20-24}$ internal olefin sulfonate and a $C_{24-28}$ internal olefin sulfonate wherein the weight ratio of the $C_{20-24}$ internal olefin sulfonate to the $C_{24-28}$ internal olefin sulfonate is from about 90:10 to about 70:30 of the blend, preferably about 78:22. When the salinity is greater than about 4 wt % up to about 13 wt %, the composition comprises a blend of a $C_{20-24}$ internal olefin sulfonate and a $C_{15-18}$ internal olefin sulfonate wherein the weight ratio of the $C_{20-24}$ internal olefin sulfonate to the $C_{15-18}$ internal olefin sulfonate is from about 90:10 to about 70:30 of the blend. Generally, oil fields do not have more than about 25 wt % salinity at 100° C.

An internal olefin is an olefin whose double bond is located anywhere along the carbon chain except at a terminal carbon atom. A linear internal olefin does not have any alkyl, aryl, or alicyclic branching on any of the double bond carbon atoms or on any carbon atoms adjacent to the double bond carbon atoms. Typical commercial products produced by isomerization of alpha olefins are predominantly linear and contain a low average number of branches per molecule.

In an embodiment, the hydrocarbon recovery composition may comprise from about 1 to about 75 wt % of the blend of a $C_{20\text{-}24}$ internal olefin sulfonate and a $C_{24\text{-}28}$ internal olefin sulfonate or a $C_{15\text{-}18}$ internal olefin sulfonate, preferably from about 10 to about 40 wt % and more preferably from about 20 to about 30 wt %. In an embodiment, a hydrocarbon containing composition may be produced from a hydrocarbon containing formation. The hydrocarbon containing composition may include any combination of hydrocarbons, the blend described above, a solubilizing agent, methane, water, asphaltenes, carbon monoxide and ammonia.

The remainder of the composition may include, but is not limited to, water, low molecular weight alcohols, organic solvents, alkyl sulfonates, aryl sulfonates, brine or combinations thereof. Low molecular weight alcohols include, but are not limited to, methanol, ethanol, propanol, isopropyl alcohol, tert-butyl alcohol, sec-butyl alcohol, butyl alcohol, tert-amyl alcohol or combinations thereof. Organic solvents include, but are not limited to, methyl ethyl ketone, acetone, lower alkyl cellosolves, lower alkyl carbitols or combinations thereof.

Manufacture of the Hydrocarbon Recovery Composition

The internal olefins that are used to make the internal olefin sulfonates of the present invention may be made by skeletal isomerization. Suitable processes for making the internal olefins include those described in U.S. Pat. Nos. 5,510,306, 5,633,422, 5,648,584, 5,648,585, 5,849,960, and European Patent EP 0,830,315 B1, all of which are herein incorporated by reference in their entirety. A hydrocarbon stream comprising at least one linear olefin is contacted with a suitable catalyst, such as the catalytic zeolites described in the aforementioned patents, in a vapor phase at a suitable reaction temperature, pressure, and space velocity. Generally, suitable reaction conditions include a temperature of about 200 to about 650° C., an olefin partial pressure of above about 0.5 atmosphere, and a total pressure of about 0.5 to about 10.0 atmospheres or higher. Preferably, the internal olefins of the present invention are made at a temperature in the range of from about 200 to about 500° C. at an olefin partial pressure of from about 0.5 to 2 atmospheres.

It is generally known that internal olefins are more difficult to sulfonate than alpha olefins (see "Tenside Detergents" 22 (1985) 4, pp. 193-195). In the article entitled "Why Internal Olefins are Difficult to Sulfonate," the authors state that by the sulfonation of various commercial and laboratory produced internal olefins using falling film reactors, internal olefins gave conversions of below 90 percent and further they state that it was found necessary to raise the $SO_3$:internal olefin mole ratio to over 1.6:1 in order to achieve conversions above 95 percent. Furthermore, there resulting products were very dark in color and had high levels of di- and poly-sulfonated products.

U.S. Pat. Nos. 4,183,867 and 4,248,793, which are herein incorporated by reference, disclose processes which can be used to make the branched internal olefin sulfonates of the invention. They are carried out in a falling film reactor for the preparation of light color internal olefin sulfonates. The amounts of unreacted internal olefins are between 10 and 20 percent and at least 20 percent, respectively, in the processes and special measures must be taken to remove the unreacted internal olefins. The internal olefin suflonates containing between 10 and 20 percent and at least 20 percent, respectively, of unreacted internal olefins must be purified before being used. Consequently, the preparation of internal olefin sulfonates having the desired light color and with the desired low free oil content offer substantial difficulty.

Such difficulties can be avoided by following the process disclosed in European Patent EP 0,351,928 B1, which is herein incorporated by reference.

A process which can be used to make internal olefin sulfonates for use in the present invention comprises reacting in a film reactor an internal olefin as described above with a sulfonating agent in a mole ratio of sulfonating agent to internal olefin of 1:1 to 1.25:1 while cooling the reactor with a cooling means having a temperatures not exceeding 35° C., directly neutralizing the obtained reaction product of the sulfonating step and, without extracting the unreacted internal olefin, hydrolyzing the neutralized reaction product.

In the preparation of the sulfonates derived from internal olefins, the internal olefins are reacted with a sulfonating agent, which may be sulfur trioxide, sulfuric acid, or oleum, with the formation of beta-sultone and some alkane sulfonic acids. The film reactor is preferably a falling film reactor.

The reaction products are neutralized and hydrolyzed. Under certain circumstances, for instance, aging, the beta-sultones are converted into gamma-sultones which may be converted into delta-sultones. After neutralization and hydrolysis, gamma-hydroxy sulfonates and delta-hydroxy sulfonates are obtained. A disadvantage of these two sultones is that they are more difficult to hydrolyze than beta-sultones. Thus, in most embodiments it is preferable to proceed without aging. The beta sultones, after hydrolysis, give beta-hydroxy sulfonates. These materials do not have to be removed because they form useful surfactant structures.

The cooling means, which is preferably water, has a temperature not exceeding 35° C., especially a temperature in the range of from 0 to 25° C. Depending upon the circumstances, lower temperatures may be used as well.

The reaction mixture is then fed to a neutralization hydrolysis unit. The neutralization/hydrolysis is carried out with a water soluble base, such as sodium hydroxide or sodium carbonate. The corresponding bases derived from potassium or ammonium are also suitable. The neutralization of the reaction product from the falling film reactor is generally carried out with excessive base, calculated on the acid component. Generally, neutralization is carried out at a temperature in the range of from 0 to 80° C. Hydrolysis may be carried out at a temperature in the range of from 100 to 250° C., preferably 130 to 200° C. The hydrolysis time generally may be from 5 minutes to 4 hours. Alkaline hydrolysis may be carried out with hydroxides, carbonates, bicarbonates of (earth) alkali metals, and amine compounds.

This process may be carried out batchwise, semi-continuously, or continuously. The reaction is generally performed in a falling film reactor which is cooled by flowing a cooling means at the outside walls of the reactor. At the inner walls of the reactor, the internal olefin flows in a downward direction. Sulfur trioxide is diluted with a stream of nitrogen, air, or any other inert gas into the reactor. The concentration of sulfur trioxide generally is between 2 and 4 percent by volume based on the volume of the carrier gas. In the preparation of internal olefin sulfonates derived from the olefins of the present invention, it is required that in the neutralization hydrolysis step very intimate mixing of the reactor product and the aqueous base is achieved. This can be done, for example, by efficient stirring or the addition of a polar cosolvent (such as a lower alcohol) or by the addition of a phase transfer agent.

Injection of the Hydrocarbon Recovery Composition

The hydrocarbon recovery composition may interact with hydrocarbons in at least a portion of the hydrocarbon containing formation. Interaction with the hydrocarbons may reduce an interfacial tension of the hydrocarbons with one or more fluids in the hydrocarbon containing formation. In other embodiments, a hydrocarbon recovery composition may reduce the interfacial tension between the hydrocarbons and an overburden/underburden of a hydrocarbon containing formation. Reduction of the interfacial tension may allow at least a portion of the hydrocarbons to mobilize through the hydrocarbon containing formation.

The ability of a hydrocarbon recovery composition to reduce the interfacial tension of a mixture of hydrocarbons and fluids may be evaluated using known techniques. In an embodiment, an interfacial tension value for a mixture of hydrocarbons and water may be determined using a spinning drop tensionmeter. An amount of the hydrocarbon recovery composition may be added to the hydrocarbon/water mixture and an interfacial tension value for the resulting fluid may be determined. A low interfacial tension value (e.g., less than about 1 dyne/cm) may indicate that the composition reduced at least a portion of the surface energy between the hydrocarbons and water. Reduction of surface energy may indicate that at least a portion of the hydrocarbon/water mixture may mobilize through at least a portion of a hydrocarbon containing formation.

In an embodiment, a hydrocarbon recovery composition may be added to a hydrocarbon/water mixture and the interfacial tension value may be determined. An ultralow interfacial tension value (e.g., less than about 0.01 dyne/cm) may indicate that the hydrocarbon recovery composition lowered at least a portion of the surface tension between the hydrocarbons and water such that at least a portion of the hydrocarbons may mobilize through at least a portion of the hydrocarbon containing formation. At least a portion of the hydrocarbons may mobilize more easily through at least a portion of the hydrocarbon containing formation at an ultra low interfacial tension than hydrocarbons that have been treated with a composition that results in an interfacial tension value greater than 0.01 dynes/cm for the fluids in the formation. Addition of a hydrocarbon recovery composition to fluids in a hydrocarbon containing formation that results in an ultra-low interfacial tension value may increase the efficiency at which hydrocarbons may be produced. A hydrocarbon recovery composition concentration in the hydrocarbon containing formation may be minimized to minimize cost of use during production.

Figure 1:
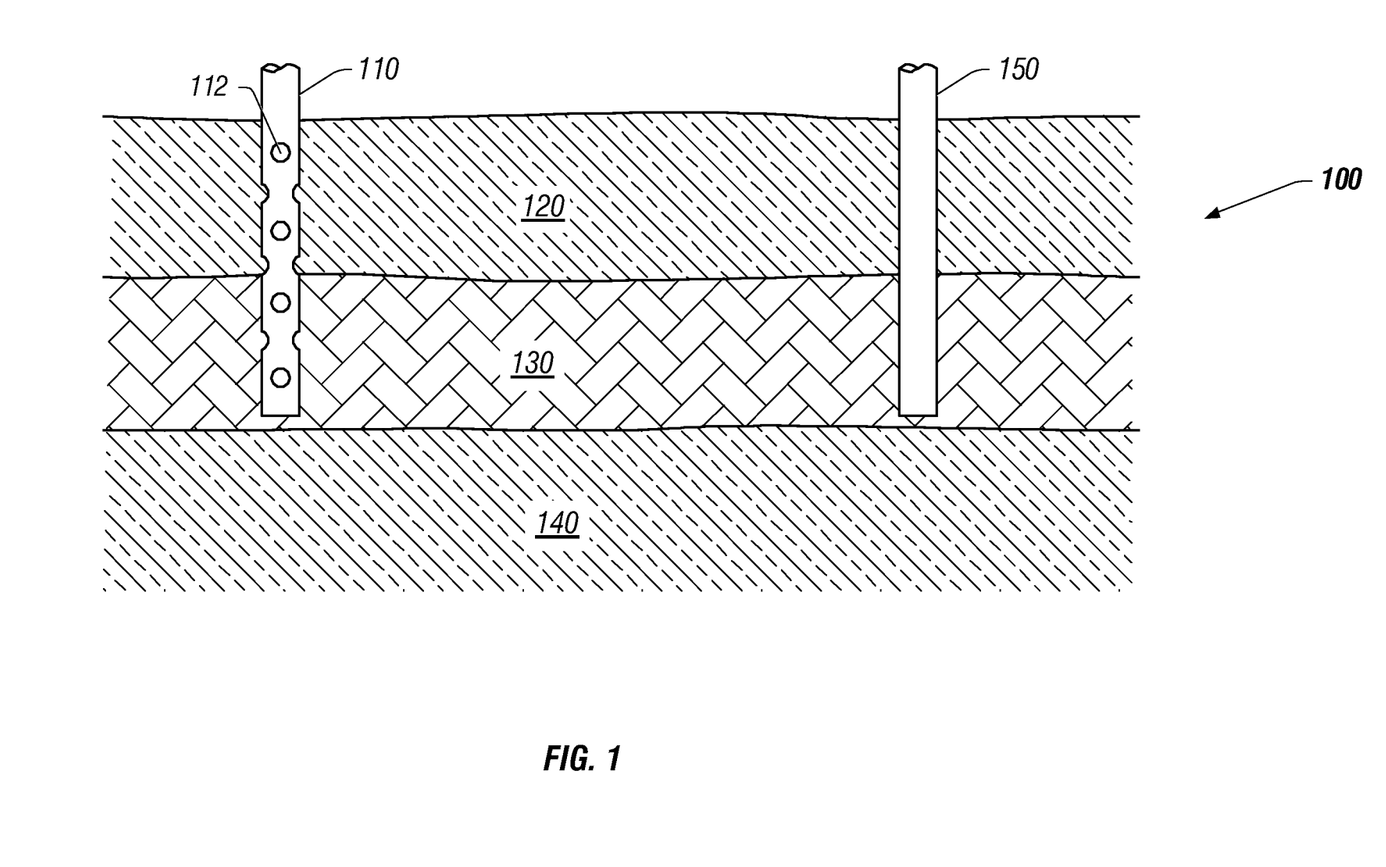
FIG. 1 depicts an embodiment of treating a hydrocarbon containing formation.

In an embodiment of a method to treat a hydrocarbon containing formation, a hydrocarbon recovery composition including a branched olefin sulfonate may be provided (e.g., injected) into hydrocarbon containing formation 100 through injection well 110 as depicted in FIG. 1. Hydrocarbon formation 100 may include overburden 120, hydrocarbon layer 130, and underburden 140. Injection well 110 may include openings 112 that allow fluids to flow through hydrocarbon containing formation 100 at various depth levels. In certain embodiments, hydrocarbon layer 130 may be less than 1000 feet below earth's surface. In some embodiments, underburden 140 of hydrocarbon containing formation 100 may be oil wet. Low salinity water may be present in hydrocarbon containing formation 100, in other embodiments.

A hydrocarbon recovery composition may be provided to the formation in an amount based on hydrocarbons present in a hydrocarbon containing formation. The amount of hydrocarbon recovery composition, however, may be too small to be accurately delivered to the hydrocarbon containing formation using known delivery techniques (e.g., pumps). To facilitate delivery of small amounts of the hydrocarbon recovery composition to the hydrocarbon containing formation, the hydrocarbon recovery composition may be combined with water and/or brine to produce an injectable fluid.

In an embodiment, the hydrocarbon recovery composition is provided to the North Sea hydrocarbon containing formation by admixing it with brine from the formation from which hydrocarbons are to be extracted. The mixture is then injected into the hydrocarbon containing formation.

In an embodiment, the hydrocarbon recovery composition is provided to a hydrocarbon containing formation 100 by admixing it with brine from the formation. Preferably, the hydrocarbon recovery composition comprises from about 0.01 to about 0.75 wt % of the total water and/or brine/hydrocarbon recovery composition mixture (the injectable fluid). More important is the amount of actual active matter that is present in the injectable fluid (active matter is the surfactant, here the blend of a $C_{20\text{-}24}$ internal olefin sulfonate and a $C_{24\text{-}28}$ internal olefin sulfonate or a $C_{15\text{-}18}$ internal olefin sulfonate). Thus, the amount of the blend in the injectable fluid may be from about 0.01 to about 0.1 wt %, preferably from about 0.04 to about 0.05 wt %. The injectable fluid is then injected into the hydrocarbon containing formation.

A solubilizer may be added to the composition/brine mixture (the injectable fluid) to keep it as a single phase before it is injected into the formation. The solubilizer may be an ethoxylated alcohol wherein the alcohol before ethoxylation had an average molecular weight of at least about 220. The solubilizer may have from about 5 to about 9 moles of ethylene oxide per mole of alcohol. In an embodiment, the solubilizer may have from about 5 to about 7 moles of ethylene oxide per mole of alcohol. The solubilizer may comprise 1 wt % or more of the total hydrocarbon recovery composition/brine mixture but a preferred solubilizer may comprise less than 0.1 wt % of the mixture, preferably about 0.02 to about 0.05 wt %.

The hydrocarbon recovery composition may interact with at least a portion of the hydrocarbons in hydrocarbon layer 130. The interaction of the hydrocarbon recovery composition with hydrocarbon layer 130 may reduce at least a portion of the interfacial tension between different hydrocarbons. The hydrocarbon recovery composition may also reduce at least a portion of the interfacial tension between one or more fluids (e.g., water, hydrocarbons) in the formation and the underburden 140, one or more fluids in the formation and the overburden 120 or combinations thereof.

In an embodiment, a hydrocarbon recovery composition may interact with at least a portion of hydrocarbons and at least a portion of one or more other fluids in the formation to reduce at least a portion of the interfacial tension between the hydrocarbons and one or more fluids. Reduction of the interfacial tension may allow at least a portion of the hydrocarbons to form an emulsion with at least a portion of one or more fluids in the formation. An interfacial tension value between the hydrocarbons and one or more fluids may be altered by the hydrocarbon recovery composition to a value of less than about 0.1 dyne/cm. In some embodiments, an interfacial tension value between the hydrocarbons and other fluids in a formation may be reduced by the hydrocarbon recovery composition to be less than about 0.05 dyne/cm. An interfacial tension value between hydrocarbons and other fluids in a formation may be lowered by the hydrocarbon recovery composition to less than 0.001 dyne/cm, in other embodiments.

At least a portion of the hydrocarbon recovery composition/hydrocarbon/fluids mixture may be mobilized to production well 150. Products obtained from the production well 150 may include, but are not limited to, components of the hydrocarbon recovery composition (e.g., a long chain aliphatic alcohol and/or a long chain aliphatic acid salt), methane, carbon monoxide, water, hydrocarbons, ammonia, asphaltenes, or combinations thereof. Hydrocarbon production from hydrocarbon containing formation 100 may be increased by greater than about 50% after the hydrocarbon recovery composition has been added to a hydrocarbon containing formation.

In certain embodiments, hydrocarbon containing formation 100 may be pretreated with a hydrocarbon removal fluid. A hydrocarbon removal fluid may be composed of water, steam, brine, gas, liquid polymers, foam polymers, monomers or mixtures thereof. A hydrocarbon removal fluid may be used to treat a formation before a hydrocarbon recovery composition is provided to the formation. Hydrocarbon containing formation 100 may be less than 1000 feet below the earth's surface, in some embodiments. A hydrocarbon removal fluid may be heated before injection into a hydrocarbon containing formation 100, in certain embodiments. A hydrocarbon removal fluid may reduce a viscosity of at least a portion of the hydrocarbons within the formation. Reduction of the viscosity of at least a portion of the hydrocarbons in the formation may enhance mobilization of at least a portion of the hydrocarbons to production well 150. After at least a portion of the hydrocarbons in hydrocarbon containing formation 100 have been mobilized, repeated injection of the same or different hydrocarbon removal fluids may become less effective in mobilizing hydrocarbons through the hydrocarbon containing formation. Low efficiency of mobilization may be due to hydrocarbon removal fluids creating more permeable zones in hydrocarbon containing formation 100. Hydrocarbon removal fluids may pass through the permeable zones in the hydrocarbon containing formation 100 and not interact with and mobilize the remaining hydrocarbons. Consequently, displacement of heavier hydrocarbons adsorbed to underburden 140 may be reduced over time. Eventually, the formation may be considered low producing or economically undesirable to produce hydrocarbons.

In certain embodiments, injection of a hydrocarbon recovery composition after treating the hydrocarbon containing formation with a hydrocarbon removal fluid may enhance mobilization of heavier hydrocarbons absorbed to underburden 140. The hydrocarbon recovery composition may interact with the hydrocarbons to reduce an interfacial tension between the hydrocarbons and underburden 140. Reduction of the interfacial tension may be such that hydrocarbons are mobilized to and produced from production well 150. Produced hydrocarbons from production well 150 may include, in some embodiments, at least a portion of the components of the hydrocarbon recovery composition, the hydrocarbon removal fluid injected into the well for pretreatment, methane, carbon dioxide, ammonia, or combinations thereof. Adding the hydrocarbon recovery composition to at least a portion of a low producing hydrocarbon containing formation may extend the production life of the hydrocarbon containing formation. Hydrocarbon production from hydrocarbon containing formation 100 may be increased by greater than about 50% after the hydrocarbon recovery composition has been added to hydrocarbon containing formation. Increased hydrocarbon production may increase the economic viability of the hydrocarbon containing formation.

Interaction of the hydrocarbon recovery composition with at least a portion of hydrocarbons in the formation may reduce at least a portion of an interfacial tension between the hydrocarbons and underburden 140. Reduction of at least a portion of the interfacial tension may mobilize at least a portion of hydrocarbons through hydrocarbon containing formation 100. Mobilization of at least a portion of hydrocarbons, however, may not be at an economically viable rate.

In one embodiment, polymers and/or monomers may be injected into hydrocarbon formation 100 through injection well 110, after treatment of the formation with a hydrocarbon recovery composition, to increase mobilization of at least a portion of the hydrocarbons through the formation. Suitable polymers include, but are not limited to, CIBA® ALCOFLOOD®, manufactured by Ciba Specialty Additives (Tarrytown, N.Y.), Tramfloc® manufactured by Tramfloc Inc. (Temple, Ariz.), and HE® polymers manufactured by Chevron Phillips Chemical Co. (The Woodlands, Tex.). Interaction between the hydrocarbons, the hydrocarbon recovery composition and the polymer may increase mobilization of at least a portion of the hydrocarbons remaining in the formation to production well 150.

The internal olefin sulfonate blend component of the composition is thermally stable and may be used over a wide range of temperature. In some embodiments, a hydrocarbon recovery composition may be added to a portion of a hydrocarbon containing formation 100 that has an average temperature of from 0 to 150° C. because of the high thermal stability of the internal olefin sulfonate.

Figure 2:
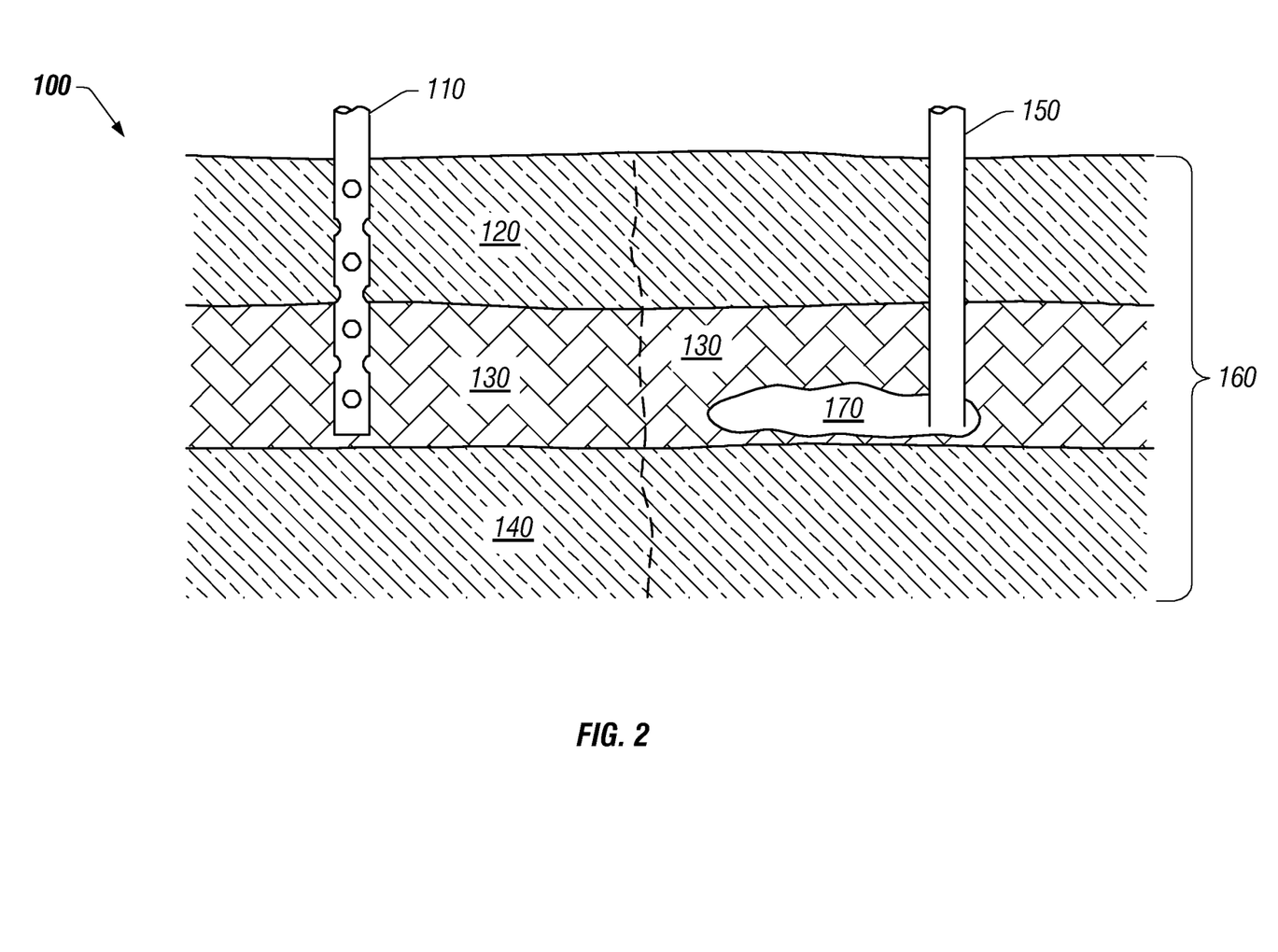
FIG. 2 depicts an embodiment of treating a hydrocarbon containing formation.

In some embodiments, a hydrocarbon recovery composition may be combined with at least a portion of a hydrocarbon removal fluid (e.g. water, polymer solutions) to produce an injectable fluid. The hydrocarbon recovery composition may be injected into hydrocarbon containing formation 100 through injection well 110 as depicted in FIG. 2. Interaction of the hydrocarbon recovery composition with hydrocarbons in the formation may reduce at least a portion of an interfacial tension between the hydrocarbons and underburden 140. Reduction of at least a portion of the interfacial tension may mobilize at least a portion of hydrocarbons to a selected section 160 in hydrocarbon containing formation 100 to form hydrocarbon pool 170. At least a portion of the hydrocarbons may be produced from hydrocarbon pool 170 in the selected section of hydrocarbon containing formation 100.

In other embodiments, mobilization of at least a portion of hydrocarbons to selected section 160 may not be at an economically viable rate. Polymers may be injected into hydrocarbon formation 100 to increase mobilization of at least a portion of the hydrocarbons through the formation. Interaction between at least a portion of the hydrocarbons, the hydrocarbon recovery composition and the polymers may increase mobilization of at least a portion of the hydrocarbons to production well 150.

In some embodiments, a hydrocarbon recovery composition may include an inorganic salt (e.g. sodium carbonate ($Na_2CO_3$), sodium chloride (NaCl), or calcium chloride ($CaCl_2$)). The addition of the inorganic salt may help the hydrocarbon recovery composition disperse throughout a hydrocarbon/water mixture. The enhanced dispersion of the hydrocarbon recovery composition may decrease the interactions between the hydrocarbon and water interface. The decreased interaction may lower the interfacial tension of the mixture and provide a fluid that is more mobile.

EXAMPLES

Example 1

Hydrocarbon recovery compositions including internal olefin sulfonate blends were prepared and interfacial tension measurements were compared for a variety of different compositions. $C_{15-18}$, $C_{20-24}$ and $C_{24-28}$ internal olefins were made. These internal olefins were sulfonated and tested as described below.

The $C_{20-24}$ internal olefins (made from alpha olefins) were a mixture of only even carbon number olefins and had an average carbon number of 20.7. 4-5% of the total olefins were C18 internal olefins (18 carbon atoms), 59-61% were C20, 29-31% were C22 and 3-8% were C24. 92% of the internal olefins had from 20 to 24 carbon atoms.

The $C_{15-18}$ internal olefins were a mixture of odd and even carbon number olefins and had an average carbon number of 16.3. The C14 olefin was 1% of the total, C15 was 25%, C16 was 27%, C17 was 27%, C18 was 20% and C19 was <1%. 96% of the internal olefins had from 15 to 18 carbon atoms.

The $C_{24-28}$ internal olefins were a mixture of odd and even carbon number olefins and had an average carbon number of 26. The C23 olefin was 3% of the total, C24 was 16%, C25 was 23%, C26 was 22%, C27 was 20%, C28 was 13% and C29 was 3%. 94% of the internal olefins had from 24 to 28 carbon atoms.

Figure 3:
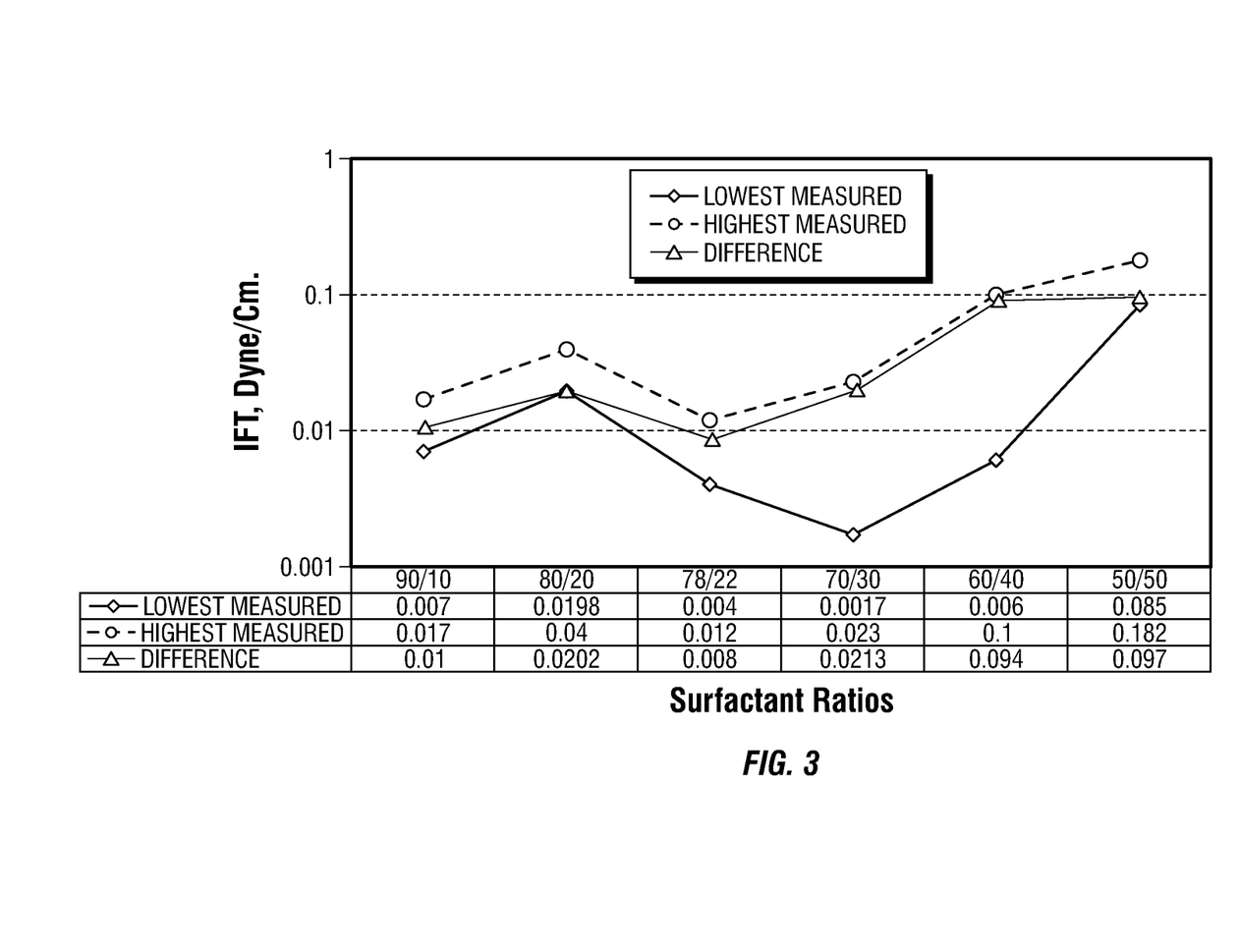
FIG. 3 and FIG. 4 show the results of several experiments were carried out with blends having different ratios of $C_{20-24}$ IOS and $C_{24-28}$ IOS.
Figure 4:
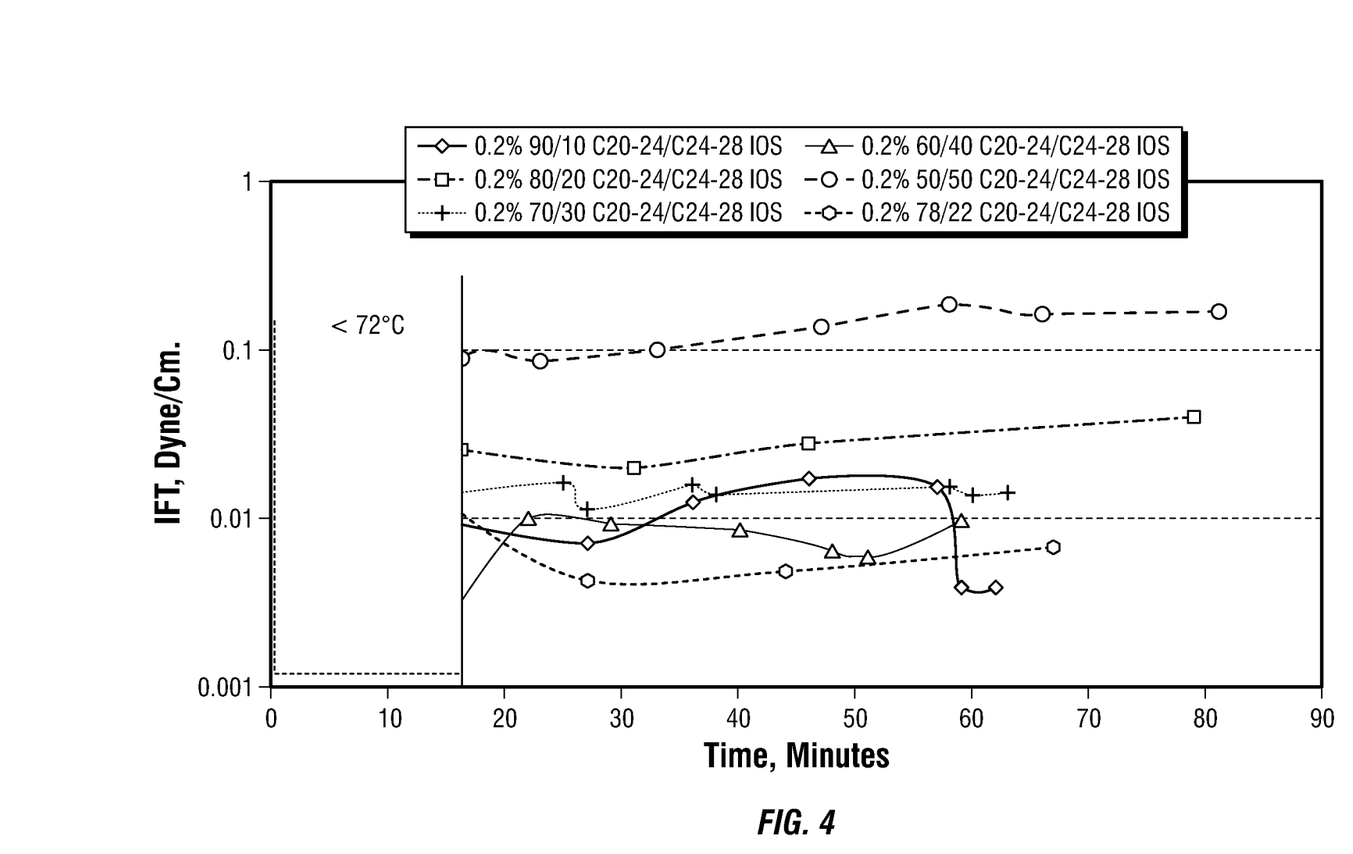

Compositions and interfacial tension measurements are tabulated in FIGS. 3 and 4 (3.1 wt % salinity). The compositions were made by mixing the hydrocarbon recovery composition with brine at the desired salinity level to obtain a 0.2 wt % active solution.

Interfacial tension values for the hydrocarbon/hydrocarbon recovery composition/water mixtures were determined using University of Texas Spinning Drop Interfacial Tensiometer (UTSDIT) model 500-PGS. A three microliter (μL) drop of n-dodecane hydrocarbon was placed into a glass capillary tube that contained a hydrocarbon recovery composition/brine solution to provide a brine-to-hydrocarbon volume ratio of 400. The tube was placed into a spinning drop apparatus and then capped. The motor was turned on rapidly to rotate the tube to create a cylindrical drop within the tube (e.g. 6 to 12 ms/rev). The drop length may be greater than or equal to 4 times the width of a drop. The capillary tube and drop were heated to various temperatures (at and above 25, 50, 75 and 98° C.). The drop was video taped for later replay for measurement of the drop dimensions and calculation of the interfacial tension between the drop and the composition/brine using an Optima® System. The time range of the measurements was from about 0.1 to about 1.0 hours to achieve drop equilibrium.

Several experiments were carried out with different ratios of $C_{20-24}$ IOS and $C_{24-28}$ IOS. It can be seen in FIGS. 3 and 4 that the 78:22 $C_{20-24}$ IOS/$C_{24-28}$ IOS blend achieved the lowest IFT.

Example 2

Figure 5:
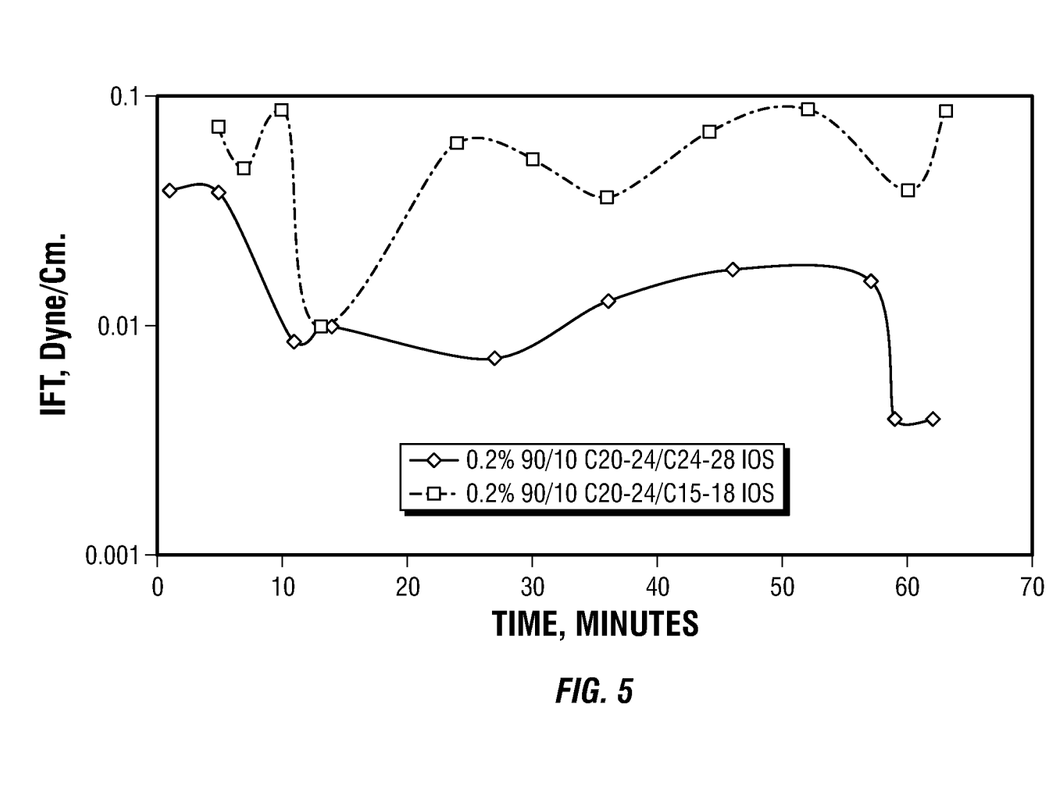
FIG. 5 compares the IFT results for a blend of a $C_{15-18}$ IOS with the $C_{20-24}$ IOS against the $C_{20-24}$ IOS/$C_{24-28}$ IOS blend of this invention at 3.1 wt % salinity.

In this experiment, a blend of a $C_{15-18}$ IOS with the $C_{20-24}$ IOS was made and compared for IFT against a $C_{20-24}$ IOS/$C_{24-28}$ IOS blend. Both blends contained 90 wt % of the $C_{20-24}$ IOS and were tested with the same crude and seawater brine (3.1 wt % salinity). It can be seen in FIG. 5 that the $C_{20-24}$ IOS/$C_{24-28}$ IOS blend of this invention achieved a much lower IFT than the comparative $C_{20-24}$ IOS/$C_{15-18}$ IOS blend.

Example 3

Figure 6:
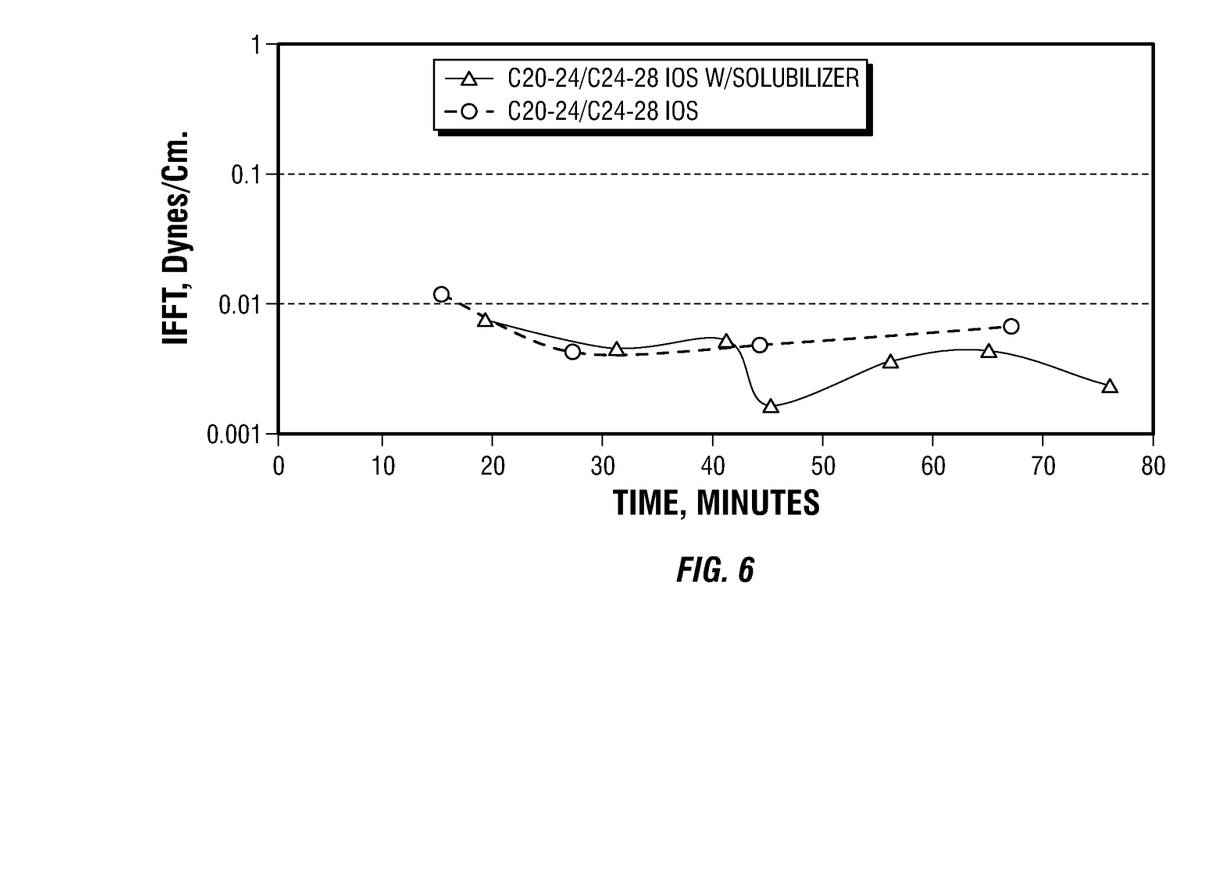
FIG. 6 compares the IFT results of the blend of this invention with and without added solubilizer.

In this experiment, 0.02 wt % of ethoxylated (7 moles of EO) NEODOL® 45 alcohol (a mixture of an alcohol with 14 carbons and an alcohol with 15 carbons) solubilizer was added to a 78:22 blend of the $C_{20-24}$ IOS and the $C_{24-28}$ IOS. It was tested with crude oil and seawater brine and compared against the blend without the solubilizer. It can be seen in FIG. 6 that the solubilizer does not have a negative effect on the IFT.

Example 4

Figure 7:
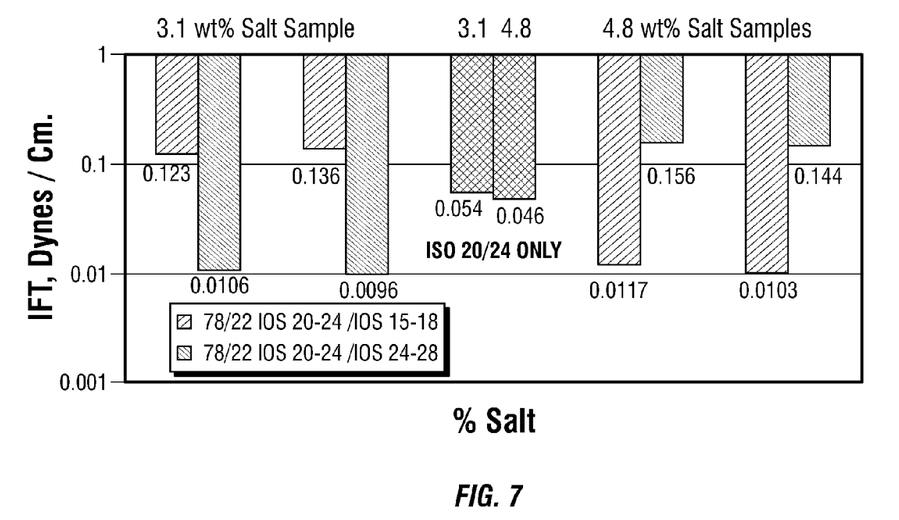
FIG. 7 compares the IFT results for a blend of a $C_{15-18}$ IOS with the $C_{20-24}$ IOS against the $C_{20-24}$ IOS/$C_{24-28}$ IOS blend of this invention at 4.8 wt % salinity.

In this experiment, a blend of a $C_{15-18}$ IOS with the $C_{20-24}$ IOS was made and compared for IFT against a $C_{20-24}$ IOS/$C_{24-28}$ IOS blend. Both blends had a 78:22 weight ratio of the $C_{20-24}$ IOS to the other IOS and were tested with a different North Sea crude and seawater brine with 3.1 wt % salinity and 1300 ppm hardness and 4.8 wt % salinity and 2000 ppm hardness. The compositions were made by mixing the hydrocarbon recovery composition with brine at the desired salinity level to obtain a 0.2 wt % active solution. It can be seen in FIG. 7 that the $C_{20-24}$ IOS/$C_{15-18}$ IOS blend of this invention achieved a much lower IFT than the $C_{20-24}$ IOS/$C_{24-28}$ IOS blend when the salinity was 4.8 wt % and that the $C_{20-24}$ IOS/$C_{24-28}$ IOS blend achieved a much lower IFT than the $C_{20-24}$ IOS/$C_{15-18}$ IOS blend when the salinity was 3.1 wt %. Additionally, the $C_{20-24}$ IOS was tested by itself at both salinities and the results show that the addition of the $C_{24-28}$ IOS improves the IFT results at 3.1 wt % salinity and the addition of the $C_{15-18}$ IOS improves the IFT results at 4.8 wt % salinity.

Example 5

Figure 8:
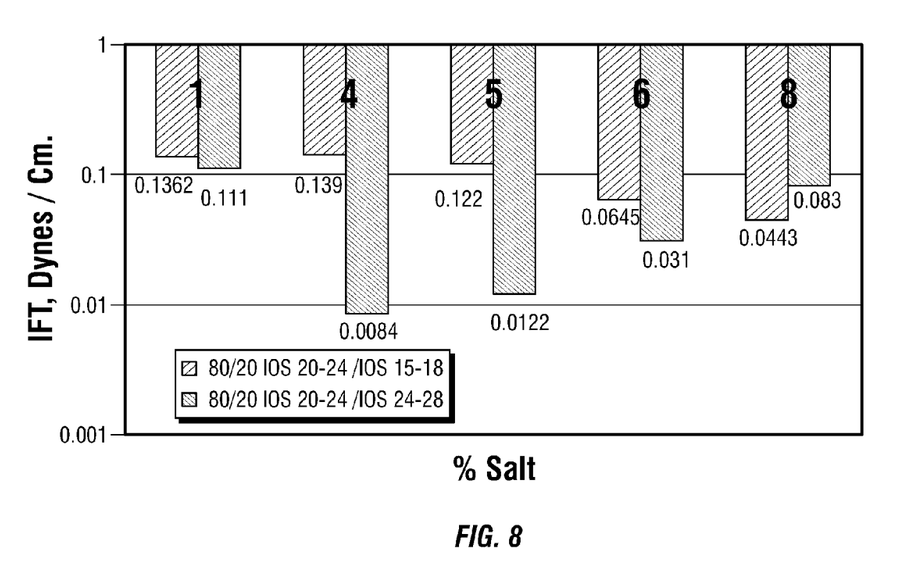
FIG. 8 compares the IFT results for an 80:20 $C_{20-24}$/$C_{15-18}$ IOS blend with an 80:20 $C_{20-24}$ IOS/$C_{24-28}$ IOS blend at various salinities.

In this experiment, 80:20 blends of $C_{20-24}$ IOS/$C_{15-18}$ IOS and $C_{20-24}$ IOS/$C_{24-28}$ IOS were tested at 72° C. in the same crude at different salinities. While the numbers cannot be directly compared with those in the previous example because the brine in these tests had no hardness, the results shown in FIG. 8 do show that the $C_{20-24}$ IOS/$C_{15-18}$ IOS blend produced increasingly lower IFT as the salinity was increased and that for the $C_{20-24}$ IOS/$C_{24-28}$ IOS blend, the IFT was increasingly lower as the salinity decreased. At the low salinity level of 1 wt % there was little difference and the IFTs were much higher.

Example 6

Figure 9:
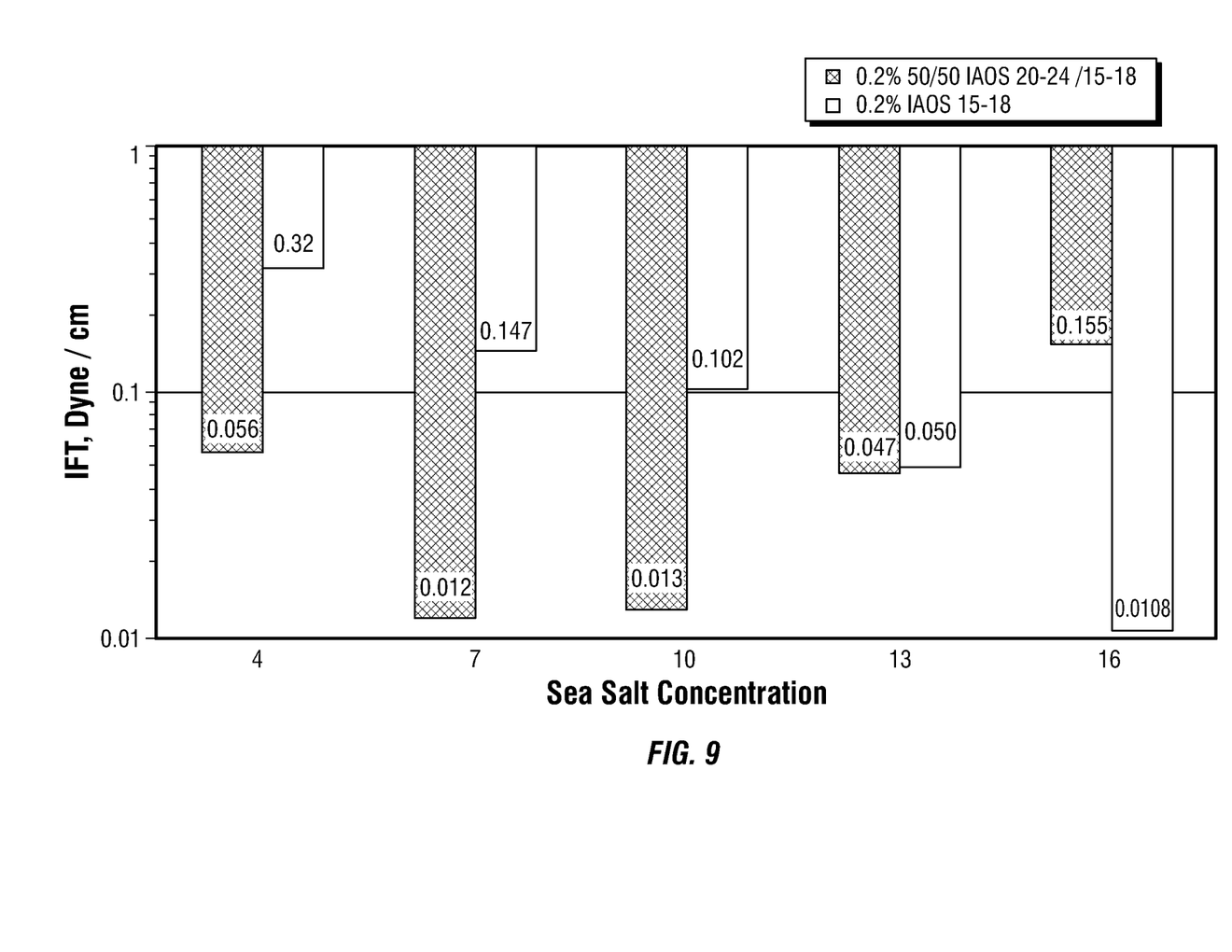
FIG. 9 compares the IFT results for an 50:50 $C_{20-24}$/$C_{15-18}$ IOS blend with an 50:50 $C_{20-24}$ IOS/$C_{24-28}$ IOS blend at various salinities.

In this experiment, a 50:50 blend of $C_{20-24}$ IOS/$C_{15-18}$ IOS and a $C_{15-18}$ IOS were tested at 90° C. in Norske crude at different salinities. The results shown in FIG. 9 show that the 50:50 $C_{20-24}$ IOS/$C_{15-18}$ IOS blend produced much lower IFT at 4, 7 and 10 wt % salinity and that the IFT of the blend was slightly lower at 13 wt % salinity.

What is claimed is:

1. A method of treating a hydrocarbon containing formation, comprising:
   (a) providing a hydrocarbon recovery composition to at least a portion of the hydrocarbon containing formation as an injectable fluid that has been admixed with brine from the formation, wherein (i) when the salinity of the brine is from about 2 wt % to about 4 wt %, the composition comprises a blend of a $C_{20-24}$ internal olefin sulfonate and a $C_{24-28}$ internal olefin sulfonate wherein the weight ratio of the $C_{20-24}$ internal olefin sulfonate to the $C_{24-28}$ internal olefin sulfonate is from about 90:10 to about 70:30 and (ii) when the salinity of the brine is greater than about 4 wt % up to about 13 wt % the composition comprises a blend of a $C_{20-24}$ internal olefin sulfonate and a $C_{15-18}$ internal olefin sulfonate wherein the weight ratio of the $C_{20-24}$ internal olefin sulfonate to the $C_{15-18}$ internal olefin sulfonate is from about 90:10 to about 70:30; and
   (b) allowing the composition to interact with hydrocarbons in the hydrocarbon containing formation.

2. The method of claim 1 wherein the blend of the $C_{20-24}$ internal olefin sulfonate and the $C_{24-28}$ internal olefin sulfonate or the $C_{15-18}$ internal olefin sulfonate comprises from about 0.01 to about 0.1 wt % of the injectable fluid, and then injecting the injectable fluid into the formation.

3. The method of claim 2 wherein the injectable fluid also comprises less than about 0.1 wt % of the total composition of a solubilizer.

4. The method of claim 3 wherein the injectable fluid comprises from about 0.02 to about 0.05 wt % of the solubilizer.

5. A method of treating a hydrocarbon containing formation, comprising:
   (a) providing a hydrocarbon recovery composition to at least a portion of the hydrocarbon containing formation as an injectable fluid that has been admixed with brine from the formation, wherein (i) when the salinity of the brine is from about 2 wt % to about 4 wt %, the composition comprises an overall IOS blend of 1) a first internal olefin sulfonate blend having an average carbon number of from about 20.5 to about 23 and at least 50% by weight, preferably at least about 65% by weight, most preferably at least about 75% by weight, of the internal olefin sulfonates in the blend contain from about 20 to about 24 carbon atoms and 2) a second internal olefin sulfonate blend having an average carbon number of from about 25 to about 27 and at least 50% by weight, preferably at least 60% by weight, most preferably at least 65% by weight, of the internal olefin sulfonates in the blend contain from about 24 to about 28 carbon atoms, wherein the weight ratio of the first internal olefin sulfonate blend to the second internal olefin sulfonate blend is from about 90:10 to about 70:30 and (ii) when the salinity of the brine is greater than about 4 wt % up to about 13 wt % the composition comprises an overall IOS blend of 1) the first internal olefin sulfonate blend and 2) a third internal olefin sulfonate blend having an average carbon number of from about 16 to about 17 and at least 50% by weight, preferably at least 75% by weight, most preferably at least 90% by weight, of the internal olefin sulfonates in the blend contain from about 15 to about 18 carbon atoms, wherein the weight ratio of the first internal olefin sulfonate blend to the third internal olefin sulfonate blend is from about 90:10 to about 70:30; and
   (b) allowing the composition to interact with hydrocarbons in the hydrocarbon containing formation.

6. The method of claim 5 wherein the overall IOS blend comprises from about 0.01 to about 0.1 wt % of the injectable fluid, and then injecting the injectable fluid into the formation.

7. The method of claim 6 wherein the injectable fluid also comprises less than about 0.1 wt % of the total composition of a solubilizer.

8. The method of claim 7 wherein the injectable fluid comprises from about 0.02 to about 0.05 wt % of the solubilizer.

* * * * *